United States Patent [19]

Baker

[11] 4,446,376
[45] May 1, 1984

[54] AUXILIARY POWER SUPPLY SWITCHING SET

[76] Inventor: Carl R. Baker, 30 Gibson St., North East, Pa. 16428

[21] Appl. No.: 264,931

[22] Filed: May 18, 1981

[51] Int. Cl.³ .............................. F03D 9/02; H02P 9/04
[52] U.S. Cl. .................................... 290/44; 290/4 R; 307/87
[58] Field of Search ...................... 290/44, 55, 4 R, 2; 307/80, 64, 66, 67, 87

[56] References Cited

U.S. PATENT DOCUMENTS

| | | | |
|---|---|---|---|
| 1,528,045 | 3/1925 | Butcher | 307/64 |
| 1,756,858 | 4/1930 | Gittings | 307/64 |
| 1,785,719 | 12/1930 | Blake | 307/64 |
| 1,786,310 | 12/1930 | McCullough | 307/64 |
| 1,859,069 | 5/1932 | Beekman | 307/64 |
| 2,468,135 | 4/1949 | Taliaferro | 307/64 |
| 2,861,198 | 11/1958 | Soos | 307/64 |
| 3,808,451 | 4/1974 | Pittet | 307/64 |
| 3,946,242 | 3/1976 | Wilkerson | 290/4 R |
| 4,180,745 | 12/1979 | Bartlett et al. | 307/87 |

*Primary Examiner*—G. Z. Rubinson
*Assistant Examiner*—Shelley Wade
*Attorney, Agent, or Firm*—Charles L. Lovercheck; Wayne L. Lovercheck; Dale R. Lovercheck

[57] ABSTRACT

A control circuit and auxiliary power supply and a switching means for connecting the load selectively to the auxiliary power supply and the main power supply. The main power supply may be a public utility power line, and the auxiliary power supply is a windmill, a motor and generator all connected together on a common shaft. A control means senses the output voltage of the generator or output frequency and controls the switch to either connect the load to the power line or the auxiliary power supply.

A battery is supplied for storing excess windmill power and for driving the motor and generator during periods of low wind.

10 Claims, 1 Drawing Figure

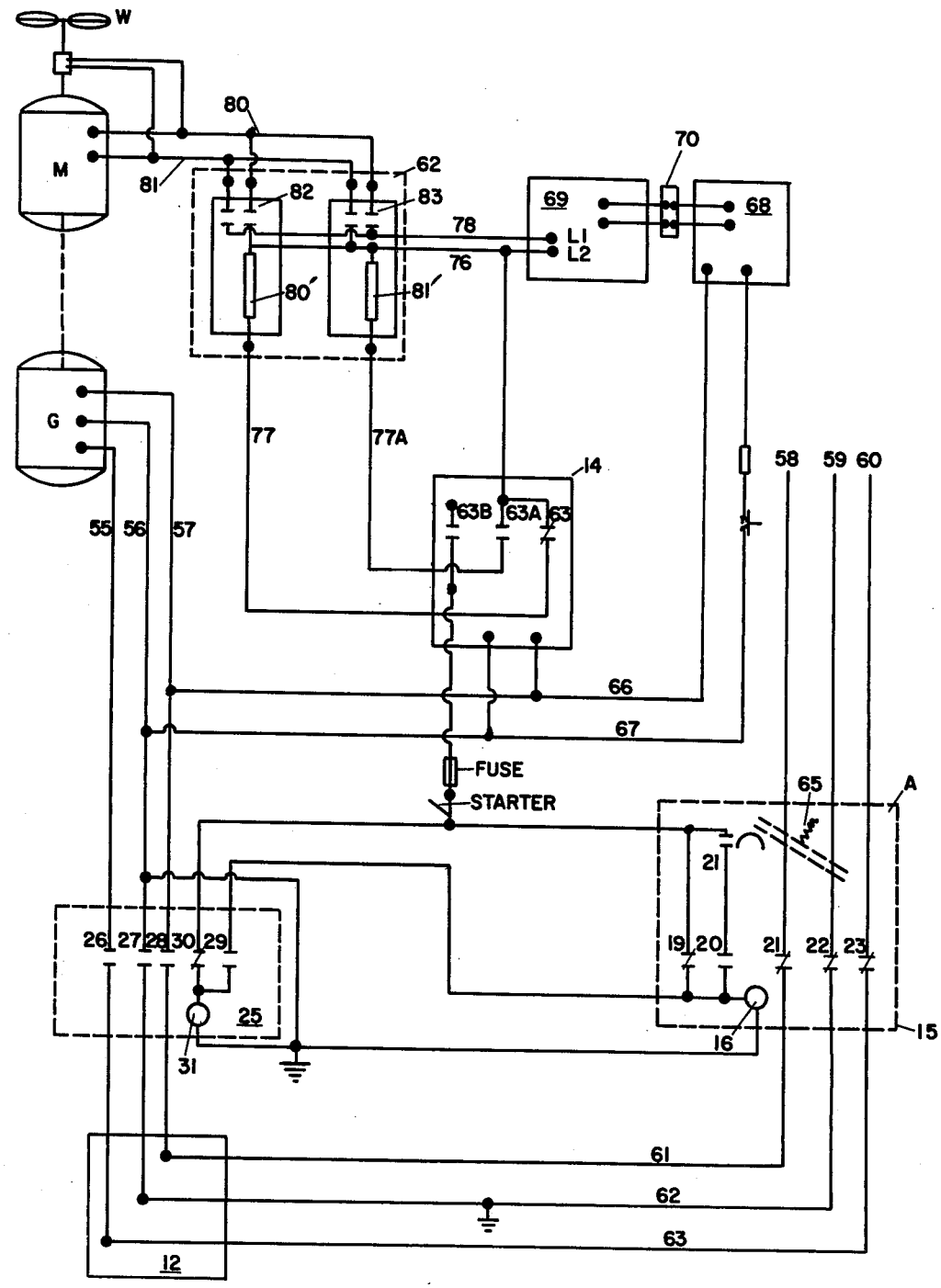

AUXILIARY POWER SUPPLY SWITCHING SET

STATEMENT OF INVENTION

The energy shortage that is extant in the world has brought attention to the need for an alternate source of energy. The energy available in the wind has long been recognized, but there is need for a practical way of utilizing the wind energy because of its intermittant nature. Applicant has invented a control circuit for utilizing the wind energy as an auxiliary power source when it is available and using the energy available from a public utility electrical line as a basic energy source.

REFERENCE TO PRIOR ART

Applicant knows of no prior art that anticipates the idea disclosed herein. U.S. Pat. Nos. 2,468,135 and 2,861,198 show the state of the art. The main purpose of U.S. Pat. No. 2,861,198 is to transfer power automatically. The prior art shows no sensing device for synchronizing the main power supply with the auxiliary power supply. When power is cut off the normal power supply, the auxiliary power supply cuts in. The circuit is not fused. The same is true of U.S. Pat. No. 2,468,135. Both patents, therefore, have many more mechanical parts than applicant's which applicant has eliminated yet retained their function. Applicant's invention therefore results in a simpler, more economical construction and is more efficient in operation.

OBJECTS OF THE INVENTION

It is an object of the invention to provide an improved control circuit for selectively connecting a main power supply and an alternate power supply to a load.

Another object of the invention is to provide an improved control circuit.

Another object of the invention is to provide a control circuit that is efficient and economical.

With the above and other objects in view, the present invention consists of the combination and arrangement of parts hereinafter more fully described, illustrated in the accompanying drawing and more particularly pointed out in the appended claims, it being understood that changes may be made in the form, size, proportions and minor details of construction without departing from the spirit or sacrificing any of the advantages of the invention.

GENERAL DESCRIPTION OF THE DRAWINGS

FIG. 1 is a schematic circuit used.

DETAILED DESCRIPTION OF THE DRAWINGS

Now, with more particular reference to the drawings, the auxiliary power supply and a main power supply A connected through lines 58, 59 and 60 and through the first switching means 15 to the load means or service panel 12 or to the auxiliary power supply made up of a motor M, generator G and windmill W, which are connected together by shaft 13. DC motor M and AC generator are connected through lines 55, 56 and 57 through contacts 26, 27 and 28 on the second switching means 25 to the service panel 12. A sensing unit 14 operates the normally closed contact 63, and normally open contacts 63A and 63B operate the second switching means contactor 25 when the voltage between lines 56 and 57 reach a predetermined value. The sensing device 14 can obviously be made to operate at a predetermined frequency so that when the frequency of the voltage from generator 6 increases to and reaches a predetermined value, the sensing device will close contact 63A and 63B and open contact 63 thereby actuating the contactor 25 through its actuating coil 31 by way of its normally closed contact 30. This will close contact 29 and energize the actuating coil 16 on the switching means 15, thereby disconnecting the main power supply from the line and connecting the lines 55, 56 and 57 through contacts 26, 27 and 28 to the service panel 12.

The battery 69 is connected to rectifier 68 and off/on switch and fuse to the lines 56 and 57, and the batteries likewise connected through terminals L1 and L2 and lines 76 and 78 and through the double starter 62 to the motor M. Thus, the motor M will be driven by the battery 69 when the voltage between lines 56 and 57 drops below a certain predetermined value. The double starter is a two-way switching starter having a first solenoid 80 and a second solenoid 81 and first contacts 82 and second contacts 83. When a wind rotates windmill W it rotates generator G and motor M. When this wind rotates generator G fast enough, battery 69 will receive a charging current through rectifier 68. As the windmill velocity increases voltage of lines 66 and 67, control 14 will be actuated through lines 66 and 67 closing contacts 82 and opening contacts 83. This will energize contactor 25 through contact 30, closing contacts 26, 27 and 28 and connecting lines 61, 62 and 63 to the windmill generator G. Contact 29 will energize solenoid 16 opening contacts 21, 22 and 23, thereby disconnecting the power lines 58, 59 and 60. Spring interlock 65 will insure through contact 21 that contacts 22, 23 and 24 are not closed when contacts 26, 27 and 28 are closed.

Contact 29 will lock contactor 25 closed, and it will stay closed until the voltage through contact 63B drops to a predetermined value.

Contact 21 will keep solenoid 16 energized until such voltage through contact 63B drops.

when the wind velocity increases to a very high value, control 14 will open, returning the double starter 62 to its position shown in FIG. 2, reversing the current to motor M which will cause it to slow down.

Disk brake D will lock the windmill W when the circuit is not in use thereby protecting the system against high winds.

Thus, in a no-wind condition first switching means 15 is closed, as shown in normal position with the power lines 58, 59 and 60 connected to the service panel 12 through normally closed contacts 22, 23 and 24.

When a stiff breeze blows, windmill W will rotate shaft 13 causing generator G to put out a voltage which will start a charging current to the battery via voltage regulator 69. When this voltage or frequency reaches a predetermined value, main controller 14 will be actuated closing contacts 63A and 63B and opening contact 63. The back EMF of motor M will oppose the flow of current from battery 67 through lines 73 and 74.

As the wind dies down, output voltage of the generator will drop below the battery voltage and the current will flow from battery 69 to motor M causing it to drive the motor and the windmill W, driving generator G until battery 69 is discharged, thereby continuing the operation or the auxiliary power supply for a maximum period of time. When the battery is discharged, the generator speed and consequently its voltage will drop, and both the motor and the windmill will stop.

Should the wind increase to a high value, controller 14 will cause double starter 62 to close normally, open contact thereby reversing the current to motor M, thereby slowing it down to control voltage at lines 55, 56 and 57.

The foregoing specification sets forth the invention in its preferred, practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. In combination, a main power supply,
an auxiliary supply,
a service panel,
and switching means for connecting the main power supply to the service panel and for selectively connecting the auxiliary power supply to the load when the voltage of the auxiliary power supply reaches a predetermined value,
said auxiliary power supply comprising a windmill,
a generator,
and a motor, all connected to a common shaft,
a battery,
means connecting the output of said generator to said battery,
a sensing means connected to the output of said battery and having means to selectively reverse connect said battery to the output of said motor depending on the voltage output of said generator thereby controlling the speed of said motor and said windmill.

2. The combination recited in claim 1 wherein said sensing means comprises a control member and,
a double starter having a first normally open contact and a second normally open contact and a normally closed contact,
a first switching means for connecting said main power supply to said first normally open contact being connected to actuating means on said second switching means,
said second normally open contact being connected to said battery and to said double starter,
said normally closed contact being connected to said double starter and to said battery for connecting said battery to said motor when the output of said generator drops below a predetermined value to drive said motor.

3. The combination recited in claim 2 wherein a rectifier is connected between the output of said generator and said battery,
whereby the output of said generator charges said battery when the output thereof exceeds a predetermined amount.

4. The combination of claim 1 wherein said voltage sensing device comprises a control means comprising,
a first normally open contact,
a second normally open contact,
and a normally closed contact,
said first normally open contact being connected to actuating means on said second switching means,
whereby said second switching means connects said auxiliary power supply to said service panel and disconnects said main power supply from said service panel when the voltage of said auxiliary power supply exceeds a certain value.

5. The combination of claim 1 wherein said means is provided to selectively connect said generator electrically to said motor and means for electrically connecting said generator to said battery, said switching means further provide a first contactor for connecting said main power supply to said service panel and a second contactor for selectively connecting said auxiliary power supply to said service panel, said sensing means being adapted to selectively activate said first contactor or said second contactor whereby said main power supply or said auxiliary power supply is selectively connected to said service panel and selectively connected to said battery to charge said battery or to connect said battery to said motor, whereby said motor is driven by said battery, and said motor drives said auxiliary generator for supplying power to said load.

6. The combination recited in claim 5 plus a voltage sensing control is connected to the output of said generator for operating said second contactor.

7. The combination recited in claim 6, wherein said control further comprises a two-way starter switch connecting said motor and said generator selectively to said battery to selectively drive said motor by power from said battery or to selectively drive said motor with power from said battery.

8. The combination recited in claim 7 wherein a disk brake is mounted on said windmill to lock said windmill when the wind driving said wind generator is low.

9. In combination a main power supply (A),
an auxiliary power supply, including a windmill, a motor, a battery, and a generator, W,M,G, (69),
a service panel (12), first power lines and second power lines, including load means (12) and sensing means (14),
first switching means (15) for electrically connecting said main power supply to said load means, and second switching means for connecting said auxiliary power supply W,M,G to said load means,
second switching means (25) for electrically connecting said auxiliary power supply (W,M,G, 69) to said load means,
control means for selectively actuating said first and second switching means selectively connecting said main power supply (11) or said auxiliary power supply W,M,G, (69) to said service panel,
said windmill (W) being mechanically connected to said motor and said generator for driving said motor and said generator,
said main power supply (A) comprising a power line (58), (59) and (60),
first electrical lines connecting said first switching means (15) to said power lines (58), (59) and (60),
said second electrical lines (55), (56) and (57) connecting said auxiliary power supply to said second switching means,
sensing means (14) having actuating means thereon connected to some of said second power lines (56) and (57),
said second power lines (55), (56) and (57) being connected to said battery,
said sensing means (14) having means thereon for actuating said first switching means (15) and
a third switching means (62) actuated by said sensing means for selectively connecting said battery to said motor to aid or to oppose the rotation of said motor and thereby control the speed of said windmill.

10. The combination recited in claim 9 wherein a disk brake is disposed on the output shaft of said windmill, whereby said windmill may be selectively held against rotation.

* * * * *